United States Patent
Merrifield

(10) Patent No.: US 10,407,896 B2
(45) Date of Patent: Sep. 10, 2019

(54) MOBILE SOLAR ARRAY AND TRUSS

(71) Applicant: CPI TECHNOLOGIES, LLC, Merritt Island, FL (US)

(72) Inventor: Donald V. Merrifield, Smyrna, TN (US)

( * ) Notice: Subject to any disclaimer, the term of this patent is extended or adjusted under 35 U.S.C. 154(b) by 0 days.

(21) Appl. No.: 16/035,924

(22) Filed: Jul. 16, 2018

(65) Prior Publication Data

US 2019/0085552 A1    Mar. 21, 2019

Related U.S. Application Data

(63) Continuation of application No. 15/596,993, filed on May 16, 2017, now Pat. No. 10,024,050, which is a
(Continued)

(51) Int. Cl.
*E04B 1/19* (2006.01)
*E04B 1/344* (2006.01)
(Continued)

(52) U.S. Cl.
CPC ............. *E04B 1/3445* (2013.01); *B64G 1/22* (2013.01); *B64G 1/222* (2013.01); *E01D 15/124* (2013.01);
(Continued)

(58) Field of Classification Search
CPC .. E04B 1/34357; E04B 1/34384; E04B 1/344; E04B 1/34336; E04B 1/34305; E04B 1/3445; E04B 1/343; E04B 1/3441; E04B 1/19; E04B 1/34331; B64G 1/222; B64G 1/44; B64G 1/66; B64G 1/22; B64G 1/443; E04H 15/48; E04H 1/005; E04H 15/46; E04H 12/182; E04H 12/18; E04H 12/187; B60P 3/34; H02S 10/40; H02S 20/00; H02S 20/30; H02S 20/10; H02S 20/20; H02S 20/032; H02S 30/00; H02S 30/10; H02S 30/20; Y10T 403/7005; Y10T 403/7007; Y10T 403/7015; Y10T 403/60; Y10T 403/602; Y10T 403/599; Y10T 403/32861; Y10T 403/32868; Y10T 403/32877; Y10T 403/32918
See application file for complete search history.

(56) References Cited

U.S. PATENT DOCUMENTS 3,593,481 A * 7/1971 Mikulin ................ E04H 12/187
14/45
3,618,111 A * 11/1971 Vaughan ............... H01Q 15/161
248/166

(Continued)

*Primary Examiner* — Joshua J Michener
*Assistant Examiner* — Matthew J Gitlin
(74) *Attorney, Agent, or Firm* — Wayne Edward Ramage; Baker Donelson

(57) ABSTRACT

A hybrid truss assembly with a truss bay centrally deployed, and with half-bays deployed on either side. The configuration provides four panels (such as solar panels), with two chords connected by four transverse members. The half-bays are locked in a rigid position using a barrel lock hinge assembly. The half-bays fold compactly beside the folded center bay assembly when retracted. The truss assembly may be pivotally mounted on a mobile cart, and may then be manually or automatically tilted or rotated to a desired angle.

4 Claims, 16 Drawing Sheets

Related U.S. Application Data continuation-in-part of application No. 15/012,402, filed on Feb. 1, 2016, now Pat. No. 9,650,781, which is a continuation of application No. 14/461,485, filed on Aug. 18, 2014, now Pat. No. 9,249,565, which is a continuation-in-part of application No. 13/708,666, filed on Dec. 7, 2012, now Pat. No. 8,813,455.

(60) Provisional application No. 61/567,697, filed on Dec. 7, 2011.

(51) Int. Cl.
| | |
|---|---|
| *E04C 3/00* | (2006.01) |
| *B64G 1/22* | (2006.01) |
| *E04C 3/04* | (2006.01) |
| *E01D 15/12* | (2006.01) |
| *E04B 1/343* | (2006.01) |
| *E04B 1/35* | (2006.01) |
| *E04C 3/02* | (2006.01) |
| *E04H 15/48* | (2006.01) |

(52) U.S. Cl.
CPC .............. *E04B 1/19* (2013.01); *E04B 1/1903* (2013.01); *E04B 1/344* (2013.01); *E04B 1/34357* (2013.01); *E04B 1/35* (2013.01); *E04C 3/005* (2013.01); *E04C 3/02* (2013.01); *E04C 3/04* (2013.01); *E04H 15/48* (2013.01); *E04B 2001/1957* (2013.01); *E04B 2001/1987* (2013.01); *Y10T 403/7005* (2015.01)

(56) References Cited

U.S. PATENT DOCUMENTS

| | | | | |
|---|---|---|---|---|
| 4,986,690 | A * | 1/1991 | Cooksey | E21B 17/02 403/27 |
| RE33,939 | E * | 5/1992 | Cheng; Alex | B62B 1/045 280/646 |
| 5,607,250 | A * | 3/1997 | Tatterson | E21B 17/046 166/377 |
| 8,539,864 | B1* | 9/2013 | Kennedy | B25B 13/461 81/177.8 |
| 9,559,232 | B1* | 1/2017 | Naud | H02S 30/20 |
| 2002/0110406 | A1* | 8/2002 | Coles | F16B 7/185 403/57 |
| 2003/0226584 | A1* | 12/2003 | Serhan | A61H 3/00 135/74 |
| 2010/0269446 | A1* | 10/2010 | Merrifield | B64G 1/22 52/646 |
| 2011/0062098 | A1* | 3/2011 | Richardson | A47B 43/00 211/85.8 |
| 2012/0313569 | A1* | 12/2012 | Curran | H02J 7/355 320/101 |
| 2013/0076008 | A1* | 3/2013 | Su | B60D 1/167 280/515 |
| 2013/0263548 | A1* | 10/2013 | Merrifield | E04C 3/02 52/646 |
| 2013/0285595 | A1* | 10/2013 | Eaton, Jr. | H01L 31/042 320/101 |
| 2014/0020731 | A1* | 1/2014 | Levi | H02S 20/00 136/245 |
| 2015/0191063 | A1* | 7/2015 | Fincher | B60D 1/44 280/474 |

\* cited by examiner

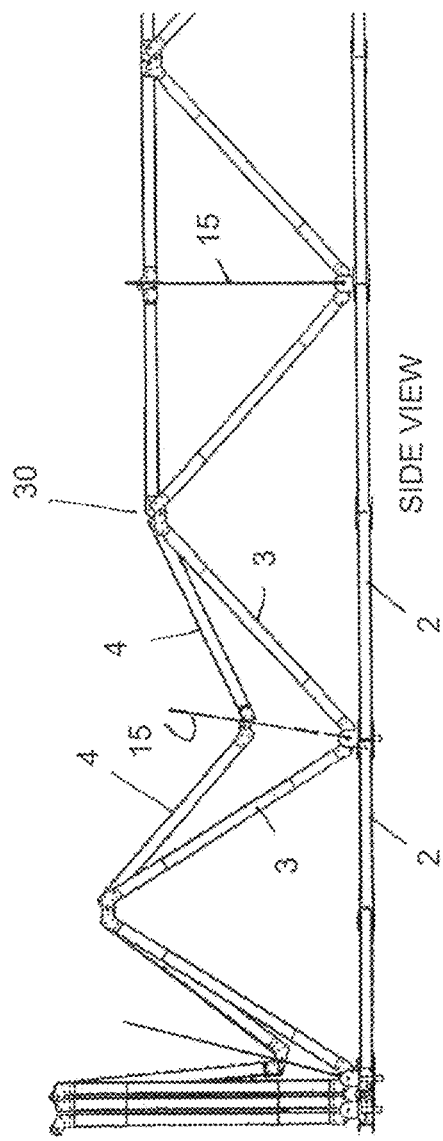
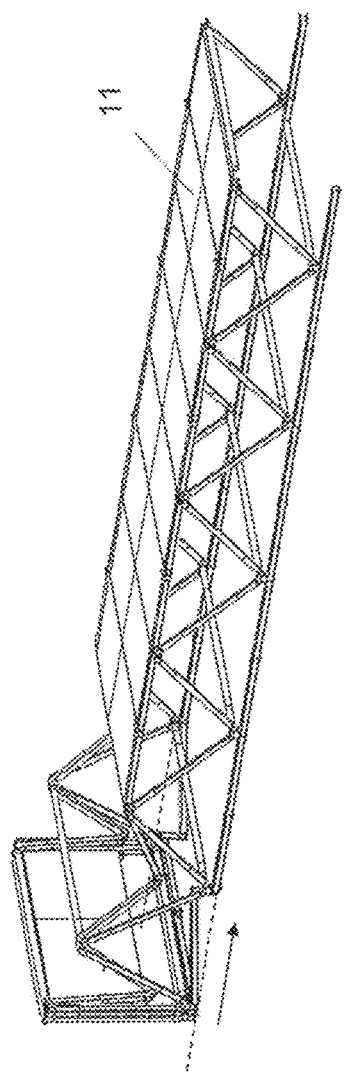
FIGURE 2A
FIGURE 2B

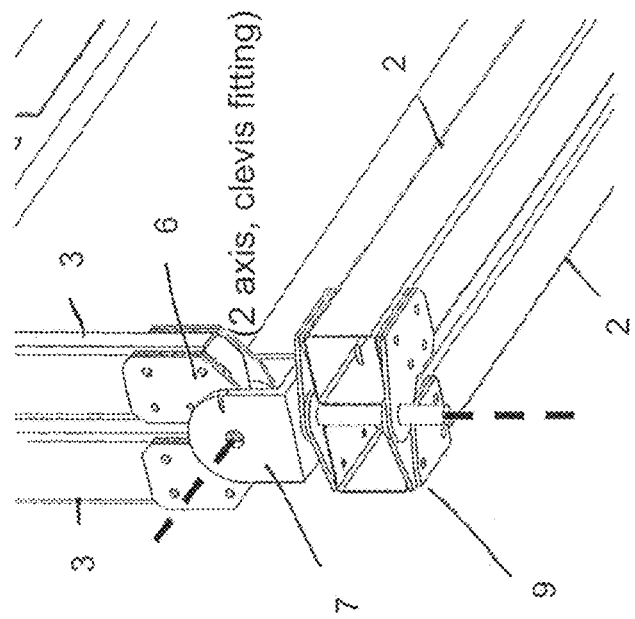
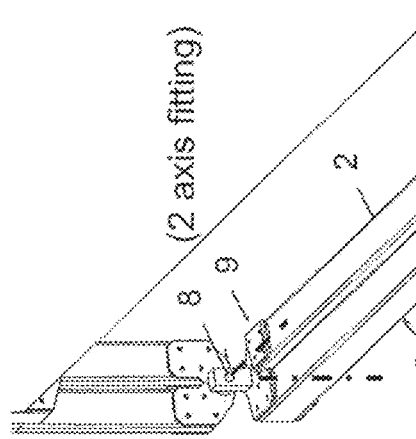
FIGURE 4A
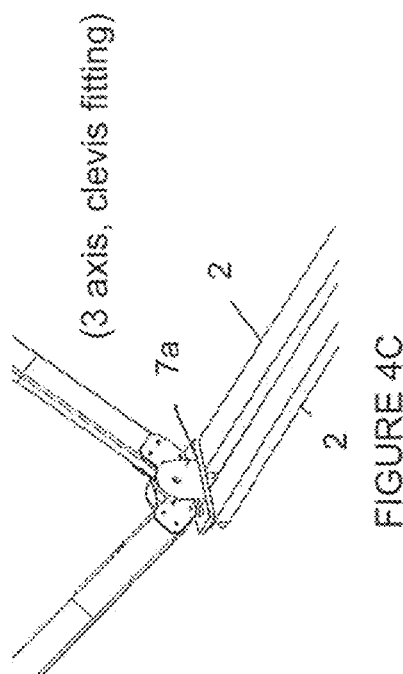
FIGURE 4B
FIGURE 4C

MOBILE SOLAR ARRAY AND TRUSS

This application is a continuation of U.S. patent application Ser. No. 15/596,993, filed May 16, 2017, which is a continuation-in-part of U.S. patent application Ser. No. 15/012,402, filed Feb. 1, 2016, now U.S. Pat. No. 9,650,781, issued May 16, 2017, which is a continuation of U.S. patent application Ser. No. 14/461,485, filed Aug. 18, 2014, now U.S. Pat. No. 9,249,565, which is a continuation-in-part of U.S. patent application Ser. No. 13/708,666, filed Dec. 7, 2012, now U.S. Pat. No. 8,813,455, which claims benefit of and priority to U.S. Provisional Application No. 61/567,697, filed Dec. 7, 2011, by Donald V. Merrifield, and is entitled to those filing dates for priority in whole or in part. The specifications, figures and complete disclosures of U.S. patent application Ser. Nos. 13/708,666; 14/461,485; 15/012,402; and Ser. No. 15/596,993; and U.S. Provisional Application No. 61/567,697, are incorporated herein by specific reference for all purposes.

FIELD OF INVENTION

This invention relates generally to deployable truss structures, such as a three-dimensional truss with orthogonally-hinged chords which expands and retracts in a continuous, stable, and sequential fashion, and has low manufacturing cost and favorable design/packaging characteristics. More particularly, this invention relates to a solar-panel truss structure sequentially deployed onto a surface from a carrier to form a solar panel array in substantially less time and with substantially less labor than prior art systems.

BACKGROUND OF THE INVENTION

There have been many attempts to design, for various operating environments, a practical compact folding or flexing truss structure which can transition easily between the retracted and the useful extended state while exhibiting favorable characteristics of size/volume ratio, kinematic stability, simplicity and reliability, structural efficiency and weight, complexity, auxiliary mechanism requirements, manufacturing costs, speed of operation, and operating cost. Relatively few designs have appeared in the marketplace. Notable high-profile, and high-flying, examples are deployable trusses used in space missions such as for solar array deployment on NASA's International Space Station. Another example is the deployable truss disclosed in U.S. Pat. No. 7,028,442, which claims priority to U.S. Provisional Patent Application No. 60/302,997 (the complete disclosures, specifications and drawings of U.S. Pat. No. 7,028,442 and Provisional Application No. 60/302,997 are incorporated herein in their entireties by specific reference for all purposes).

Yet a further example is the rectangular deployable/folding truss structure with panels disclosed in U.S. patent application Ser. No. 12/765,532, the complete disclosure, specification and drawings of which are incorporated herein in their entireties by specific reference for all purposes. The present application is an improvement over the latter structure, providing new operational and functional capabilities, design flexibilities, and manufacturing alternatives.

SUMMARY OF THE INVENTION

The present invention comprises a deployable truss with modified primary orthogonal joints. The construction of these joints causes the center-hinged primary chords on opposite sides of a truss bay to fold inward in a plane orthogonal to the folding planes of the side diagonals while the two secondary chords fold in planes orthogonal to the plane of the in-folding primary chords. This provides for stiffness and stability during deploy and retract. The unique joint configuration permits the truss to optionally deploy one bay at a time in a stable manner while having lateral bending stiffness. The truss of the present invention thus can extend and retract in a sequential manner. It can deploy integral flat panels nested between the secondary folding chords, or use cross bracing in lieu of panels. With or without integral panels the folded members and joints form a basic rectangular truss beam structure.

With an alternate embodiment of the truss diagonals, it can also form a triangular beam using the same in-folding center-hinged chords and joints. The triangular truss kinematic behavior is the same as for the rectangular truss. In all cases the trusses are symmetrical about one axis. They can retract in a length typically 4-8% of the extended length until ready for deployment, either with integral panels or simply as a rigid beam. As a panel truss, various types of square or rectangular panels can therefore be folded together compactly for transportation and handling.

In yet a further embodiment, the present invention comprises an apparatus and method for sequentially deploying a plurality of single truss bays upon a surface (such as, but not limited to, the ground, terrain, or a flat structure) being traversed by a moving carrier, such that a long, contiguous truss structure is formed or laid down on the surface. The carrier can be repeatedly reloaded with another set of truss bays for subsequent deployment. This arrangement is of particular use for the efficient and low-cost deployment and installation of both large and small arrays of solar panels. For example, a plurality of solar panels can be deployed and ready for operations in a fraction of the time and expense required to install the equivalent solar panels in the field by piece-wise assembly.

There are numerous applications benefiting from sequential bay-wise deploy/retract as compared with synchronous motion exhibited by the prior art. This is accomplished while being kinematically stable about two axes, which is particularly important for zero-gravity, low-gravity and undersea applications, and does not require a complex and costly mechanism to form each bay as in several prior deployable truss inventions, most prominently exemplified by solar array trusses used on the International Space Station, previous U.S. Space Shuttle missions, and numerous space satellites.

For use as a compact deployer of solar photovoltaic panels, there are important current applications in which critical deploy/retract operations of long multi-bay mounting structures are enabled. Space applications exist for primary and secondary structures which are kinematically extendible from a very compact packaging, for space habitats and other space or surface structures in orbit or on the Moon, Mars and asteroids. The basic configuration of this new invention opens the potential for replacement of its pin/hole revolute joints with flexible materials such as shape-memory or superelastic, for critical applications requiring zero joint free-play and dust-tolerant operation. Among the many envisioned commercial, industrial, and military applications, there are applications to mobile and fixed solar panels, towers, bridging, access platforms, conveyors, rescue platforms, fire ladders, large folding panel displays, and several others.

In yet a further embodiment, a hybrid configuration of the multi-bay truss may be deployed. A truss bay is centrally deployed, with half-bays deployed on either side. The central truss bay comprises four chordal members (corresponding to the secondary chordal members described above) with three transverse members and two panels. Each half-bay comprises two chordal members with traverse member and a panel. The configuration comprises four panels, with two chords (corresponding to the secondary chords described above) connected by four transverse members. The half-bays are locked in a rigid position using a barrel lock hinge assembly. With the single bay deployed on a suitable mounting frame, the half-bays thus are locked without requiring diagonal supports. The half-bays fold compactly beside the folded center bay assembly when retracted.

In a further embodiment, the mounting frame can pivot or move on a support cart (which may be wheeled or otherwise mobile). This permits the truss assembly to be manually or automatically tilted or rotated to the desired angle. Additional support (such as struts) may be provided. It should be noted that two or more bays with panels may be used for a longer version of the hybrid configuration (i.e., multiple bays in a linear configuration, with two half-bays deployed on either end), with suitable modifications to the mounting frames.

BRIEF DESCRIPTION OF THE DRAWINGS

FIGS. 2A and 2B show views of a rectangular truss in a partially-deployed state.

FIG. 4A shows an embodiment of the primary orthogonal joint with a 2-axis fitting.

FIG. 4B shows an embodiment of the primary orthogonal joint with a 2-axis clevis fitting.

FIG. 4C shows an embodiment of the primary orthogonal joint with a 3-axis clevis fitting.

DETAILED DESCRIPTION OF EXEMPLARY EMBODIMENTS

Figure 1A:
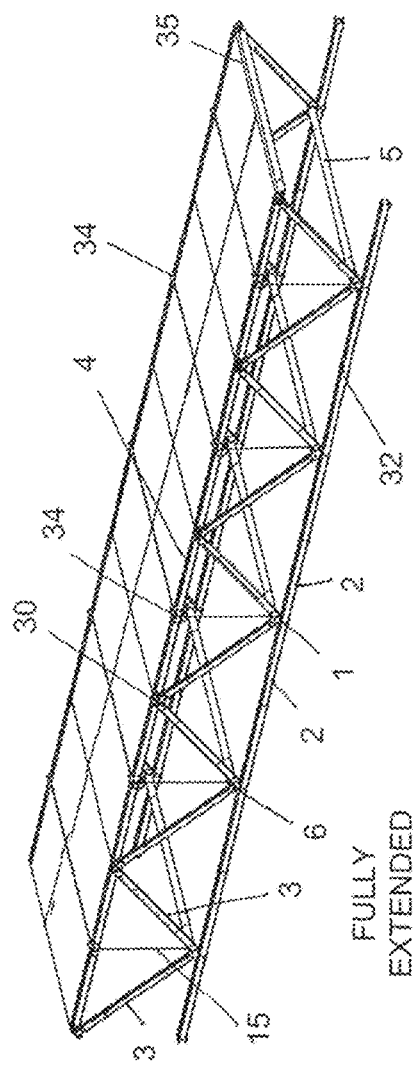
FIGS. 1A and 1B show views of a rectangular truss with five bays fully extended and retracted.
Figure 1B:
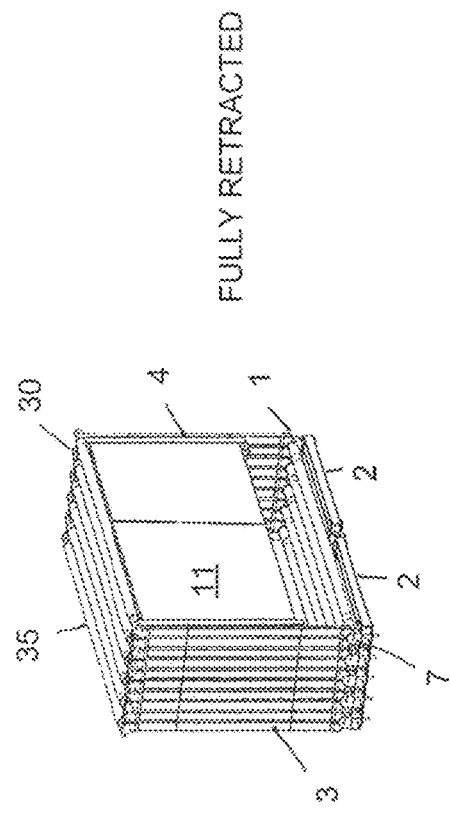

In one exemplary embodiment, as shown in FIGS. 1A and 1B, the present invention comprises a rectangular deployable/folding truss structure. The construction of modified primary 1 and secondary orthogonal joints 30 causes the two adjacent primary chordal members 2 to fold inward in a plane orthogonal to the folding planes of the side diagonals 3 while the two secondary chordal members 4 fold in planes orthogonal to the plane of the in-folding chords 2, thus synchronizing their motion. In FIG. 1, it can be seen that when the truss is fully retracted, the folded diagonals and the folded chords of each bay lie in the same transverse space, and can provide space for two integral panels 11 mounted within the secondary chords 4. This compact nesting of truss members allows the retracted truss to stow in typically 4-8% of its deployed length.

As seen in FIGS. 1A-B, 2A-B and 5, in one embodiment the truss comprises two primary chords, said primary chords comprising a plurality of primary chordal members 2 connected end-to-end by alternating primary orthogonal joints 1 and primary chord center-hinge joints 32. The primary orthogonal joints may have different geometry than the primary chord center-hinge joints. The truss also comprises at least one secondary chord (two for a rectangular or square truss, in cross-section), said secondary chord comprising a plurality of secondary chordal members 4 connected end-to-end by alternating secondary orthogonal joints 30 and secondary chord center hinge-joints 34. The secondary chord hinge joints may have different geometry than the secondary chord center-hinge joints.

The primary orthogonal joints of the prior art comprised two angled fittings to which the truss diagonals and folding chords were attached. The new joint disclosed herein, as shown in FIGS. 3A-C and 4A-C, uses a single two or three-axis fitting (7, 7a, or 8) to connect the hinge joint 6 connecting the diagonals 3 to an offset hinge joint 9 in the folding chords 2. This joint fitting constrains the diagonals 3 to fold in a plane orthogonal to the plane of the primary chords. As long as the pivot axes are oriented as shown, a single two pin fitting 8 can be used, as shown in FIG. 4A, located either outside or inside of the hinge joint which connects the diagonals. Alternatively, a clevis fitting 7 which fits around the hinge joint connecting the diagonal ends can be used. An alternate 3-axis fitting embodiment 7a is shown in FIG. 4C, which has the same kinematic behavior but provides for the adjacent primary chords to be connected directly to the primary joint 1 without use of an offset hinge joint as in the alternative embodiment using fittings 7. In one embodiment, the primary chordal members are connected directly to the joint on opposite sides of the clevis axis.

The joints connecting the diagonals at their respective ends in a z-fold manner, have an offset hinge pin to allow the diagonal members to fold parallel to each other as the truss retracts. The primary chords (and the secondary chords) have the same hinging, but the primary chords connect to the diagonals with the fitting 7, 7a, or 8 as described above, while the secondary chords connect with a single axis hinge pin 10 in the secondary orthogonal joint 30. This allows the secondary chords to fold orthogonally to the primary chords creating the stability and stiffness of the extending or retracting truss. The primary chords, which are center-hinged in the preferred embodiment, can optionally be replaced by flexible tension members.

Figure 3B:
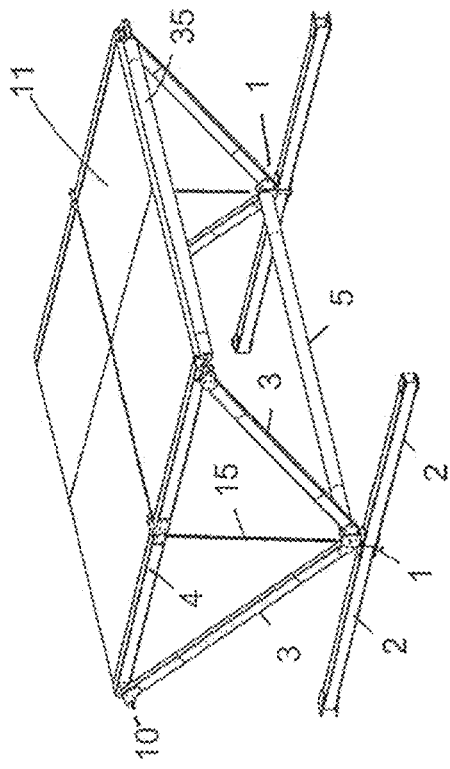
FIG. 3B shows a single rectangular truss bay in a deployed state.
Figure 3C:
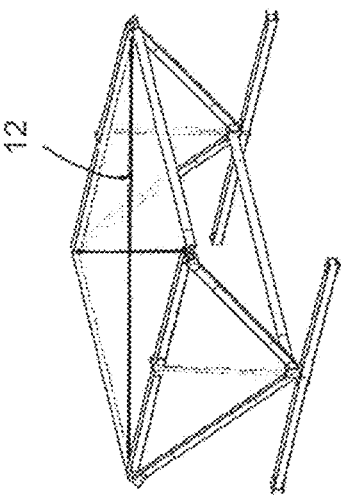
FIG. 3C shows another single rectangular truss bay in a deployed state.
Figure 3A:
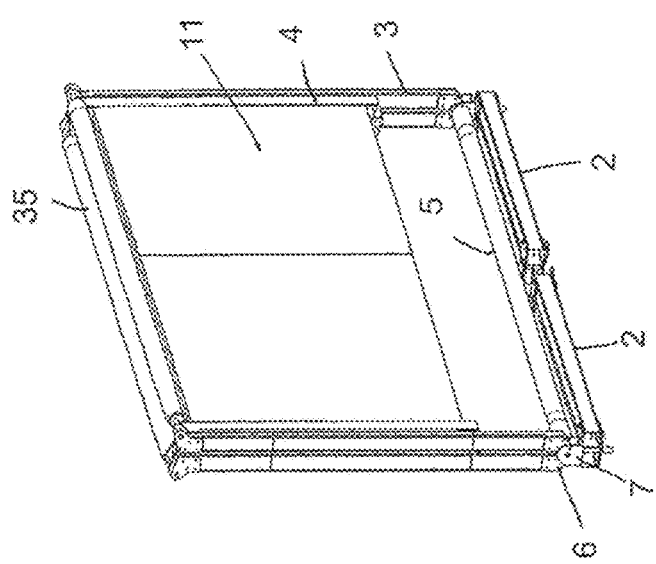
FIG. 3A shows a single rectangular truss bay in a retracted state.

Referring to FIGS. 1A-B and 3A-C, it should be noted that the primary orthogonal joints 1 may be connected by transverse members 5 which connect the truss sides and determine the truss width (not shown in FIG. 4). Similar transverse members, braces, or chords (flexible or rigid) 35 may extend between the secondary orthogonal joints 30. Cross-bracing 12 may also be used between the secondary chords, as seen in FIG. 3B. This unique joint configuration permits the truss to deploy one bay at a time (as shown in FIG. 2), and with lateral bending stability. The truss bays thus can extend and retract in a sequential manner without need for a complex deployment system or mechanism. The truss can deploy, in z-fold manner, either flat panels 11 nested between the secondary folding chords 4, or transverse members 35, or cross bracing 12 without panels. Panels may comprise any type of panels known in the art, including, but not limited to, solar panels, heat radiation panels, floor panels, wall panels, LCD panels, display panels, or radar panels.

Figure 7:
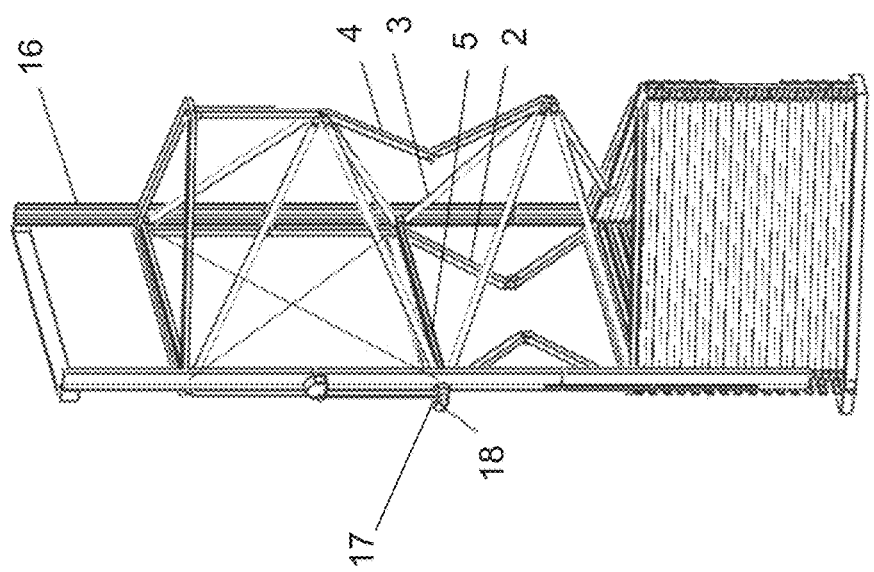
FIG. 7 shows a powered triangular truss in a partially-deployed state.

Although the truss can be readily deployed on a flat surface or in low gravity, in one exemplary embodiment an important method for powered truss deployment and retraction is the use of a support frame 16 with side rails into which rollers 18 fit to support and guide the deployment motion, as seen in FIG. 7. The rollers 18 can be mounted on the primary joints 1, in line with the transverse members 5. The rail structure or support frame may be folding. The rails are preferably long enough to accommodate the first two truss bays and can fold or stow around the retracted truss bays. The support frame can be vertical, horizontal, or angled, and can be used with the rectangular, square, triangular, or other forms of the truss.

In one embodiment of the rail-supported powered truss, a transverse bar 17 moves longitudinally up and down the rail structures, and can grasp or engage each of the primary orthogonal joints. The bar successively engages the joints and moves them until truss chords lock (or, conversely, unlock), thus forming or collapsing each truss bay in succession. The transverse bar and truss structure may be powered by a motor or other suitable means known in the art.

Figure 5B:
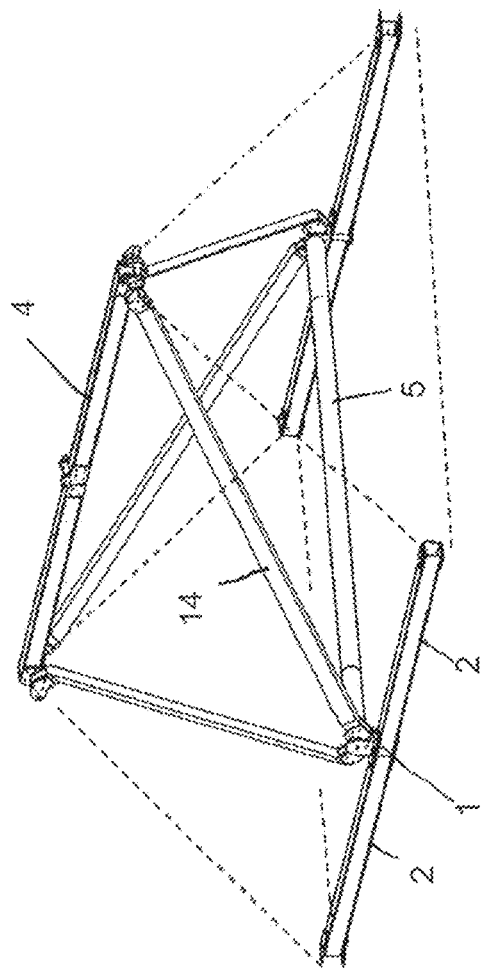
FIGS. 5A and 5B show a triangular truss in accordance with an alternative embodiment of the present invention.
Figure 5A:
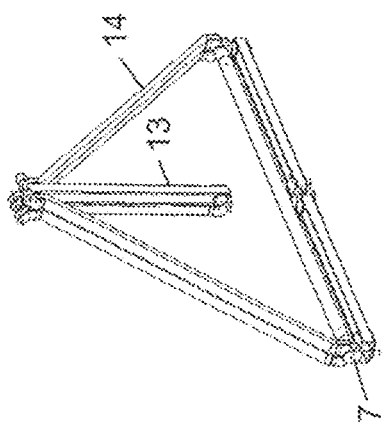
Figure 5C:
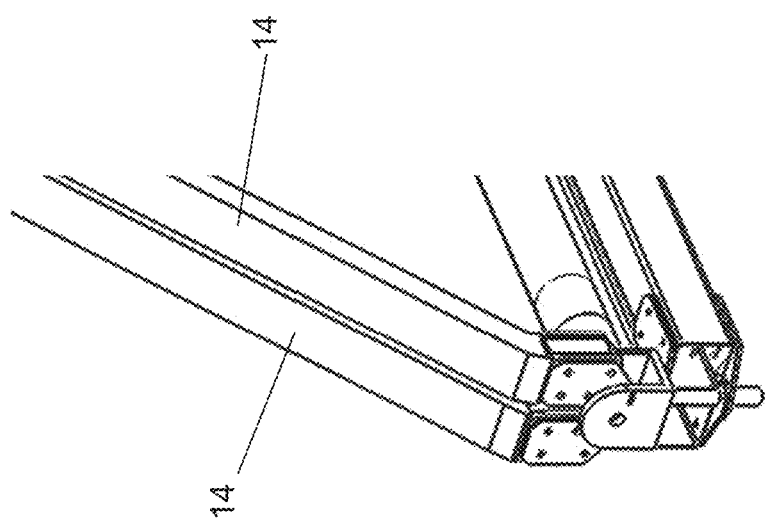
FIG. 5C shows angled offset fittings at the end of the diagonal members of the triangular truss.

With or without integral panels, the folded members and joints can form a rectangular or a square truss beam. With an alternate embodiment of the truss diagonals, it can be configured as a triangular beam using the same in-folding center-hinged chords and joints, but with a single chord of center-hinged secondary chordal members 4 at the apex of the resulting hinged triangular frames. In this triangular configuration pairs of opposite truss diagonals 14 are connected to the secondary (apex) chordal members 4, as seen in FIGS. 5A-B. The diagonals have angled hinge fittings at each of their ends, as shown in FIG. 5C, and fold as shown. The kinematic behavior is the same as for the rectangular embodiment.

Figure 6:
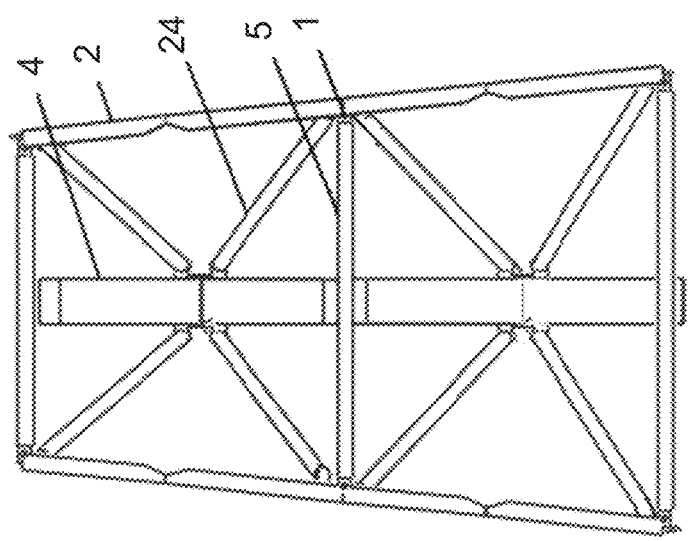
FIG. 6 shows a tapered deployable triangular truss.

As shown in FIG. 6, the transverse members 5 may be successively lengthened or shorted along the truss, so that the truss has a tapered configuration. The diagonals 24 and angled end fittings are configured such that retracted assemblies deploy to form a tapered truss structure. The truss can be tapered in one or two directions (e.g., longitudinal and lateral tapering). The orthogonal joints may have the same geometry as in the non-tapered configuration, and the primary and secondary chords may comprise the same general geometry. In one embodiment, to achieve proper folding of the primary and secondary chords, the center hinge joints are off-center.

In all cases the trusses have at least one-axis symmetry. They can be retracted as shown in FIG. 1A-B until ready for deployment. In this manner, the truss, with or without various types of panels 11, can be folded together compactly for transportation and handling. Truss actuation can be manual or powered using a variety of methods: electrical, fluid, stored energy or other means.

The primary and secondary truss joints, as well as the chordal center hinges can also be adapted to use flexible material hinges replacing certain or all of the pin/hole revolute joint hinges, with potential for spring-powered deployment using energy stored in the hinge material. The flexible material may comprise shape-memory alloy (SMA) or spring material.

With further reference to FIG. 1A-B, the center hinge joints of the primary chords and secondary chords may be fitted with suitable locking devices to lock the truss in its fully deployed state. They can be of various types and can be manual or remotely operated. In one embodiment, the secondary chords, to which flat panels 11 can be attached, comprise a support strut 15 which deploys in synchronization with the folding of the truss members. For optional powered truss operation, the chordal center joints can be fitted with suitable rotary actuators.

Figure 8:
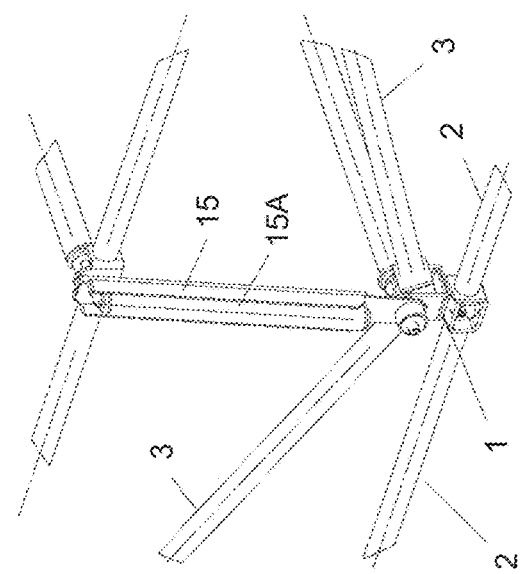
FIG. 8 shows a latching support strut with power actuator.

FIG. 8 shows an embodiment with a latching support strut 15 and a power actuator 15A. The power actuator is optional. The support strut 15 deploys from the folded state with spring-force mating to the center hinge joints of the secondary chords. The joint's hinge pin slides in a groove on the backside of the strut until it is captured in a hole at the top of the strut, thereby latching the strut to the secondary joint and providing structural support. The strut is retained in position by spring force. This eliminates the need for latching of the secondary chord center hinge joints. This motion may be caused by the lifting of the joints, but also can be assisted or effected by a linear power actuator 15A, which in effect drives the hinge pin to the latch hole where it is captured.

Figure 9:
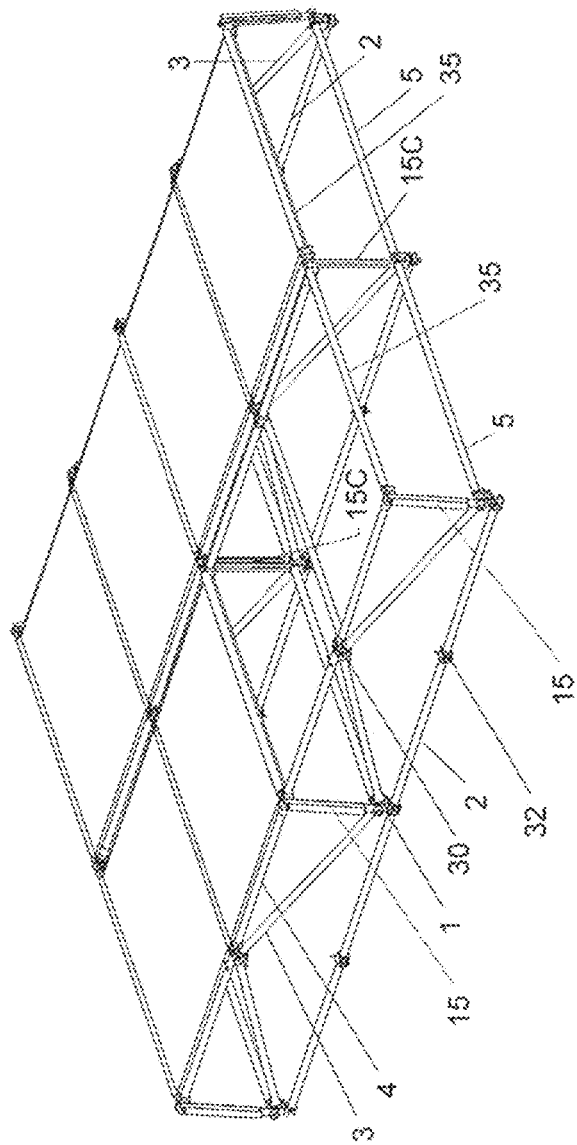
FIG. 9 shows a double-row rectangular truss with bays fully extended.

The basic truss of the present invention can also be configured in a system as a plurality of truss bays merged laterally. FIG. 9 shows an alternative embodiment with two trusses merged laterally to form a double-row folding truss. Interior diagonals are not duplicated, but instead are shared by adjacent truss rows. This permits deployment of twice the number of panels while using fewer chords and diagonals overall, but still deploying and retracting in the same fashion as described above for a single truss. In several embodiments, the interior (or center) support strut 15C is modified to support the center hinge joints of the center secondary chords. The interior center strut 15C deploys and latches passively or actively in the same manner as the support strut 15 described above.

In yet a further embodiment, the present invention comprises an apparatus and method for sequentially deploying a plurality of single truss bays upon a surface (such as, but not limited to, the ground, terrain, or a flat structure) being traversed by a moving carrier, such that a long, contiguous truss structure is formed or laid down on the surface. The carrier can be repeatedly reloaded with another set of truss bays for subsequent deployment. This arrangement is of particular use for the efficient and low-cost deployment and installation of both large and small arrays of solar panels. For example, a plurality of solar panels can be deployed and ready for operations in a fraction of the time and expense required to install the equivalent solar panels in the field by piece-wise assembly.

Figure 10A:
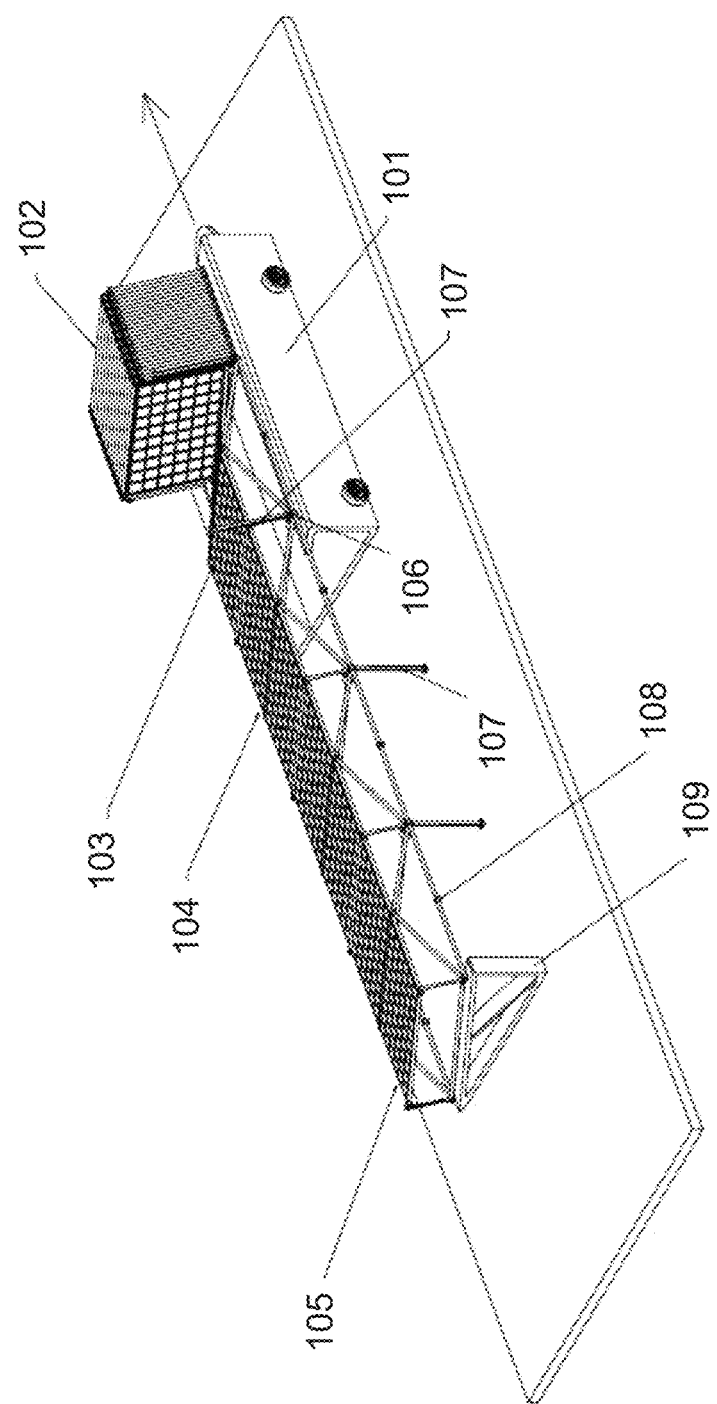
FIG. 10A shows the deployment process of a tilted or angled solar panel array strip.

FIG. 10A shows the truss of FIGS. 1A and 1B mounted on an angled carrier platform or cart 101. The carrier platform may be wheeled or otherwise configured to allow movement. The truss is being deployed at an angle to the surface (e.g., ground, terrain or flat structure) from the fixed frame 109 on the surface towards the right side (i.e., in the direction of the arrow). Multiple truss bays deploy from the angled-top carrier platform 101 with the plurality of folded truss bays in a "stack." 102. The first truss bay 105 is fixed to the surface or terrain by the frame 109. As the carrier 101 moves forward and away from the frame 109, the stack 102 sequentially releases truss bay members 104, which unfold as shown to form a long contiguous truss structure with solar panels 103. The solar panel center hinges may be raised by either manual or automated means. As the carrier moves forward, the primary joints 106 for one or both primary chords, which are initially supported by the carrier 101, become supported by fold-down struts 107, which are vertically deployed sequentially under each primary joint 106 as needed. The struts are suitably hingedly attached to the primary joints.

In the embodiment shown, carrier 101 with stack 102 is angled so as to cause the solar panels deployed with the truss to be positioned at a pre-determined angle for solar operation; thus, one primary chord is maintained at a greater height than the other primary chord, and the struts 107 under the higher primary chord are of a height essentially equal to the height of the back of the frame in order to maintain this pre-determined angle. The angle may be pre-determined for optimal exposure to the sun (or other light source) for the deployment location, and the season. In one exemplary embodiment, the angle is between 0 to 45 degrees with respect to the surface. The frame 109 also may be angled. Following deployment of a desired length of truss, some or all of the surface terrain contact points may be suitably anchored, manually or by automated means.

It should be noted that the carrier 101 with stack 102 may be fixed or stationary, while the truss is deployed from the stack. In one example, the truss is deployed from the stack by a mobile frame moving away from the carrier in the desired direction. In any case, the truss may be fully removed from the carrier when deployed, and supported by a frame 109 or equivalent at both ends. In an alternative embodiment, the carrier may remain and be used to support an end of the truss when fully deployed.

A truss with integral solar panels thus can be sequentially deployed, in automated fashion, truss bay by truss bay, upon a surface being traversed by the moving carrier such that a long contiguous truss structure is readily formed or laid down on the surface or terrain. This system thereby establishes a plurality of solar panels positioned at a predetermined angle (i.e., tilted), performed in a fraction of the time and expense required to install the panels with conventional support racking in the field using existing piece-wise assembly operations. The carrier can move at variable or constant speed. In one exemplary embodiment, the carrier moves at a speed of approximately 2 mph.

Figure 10B:
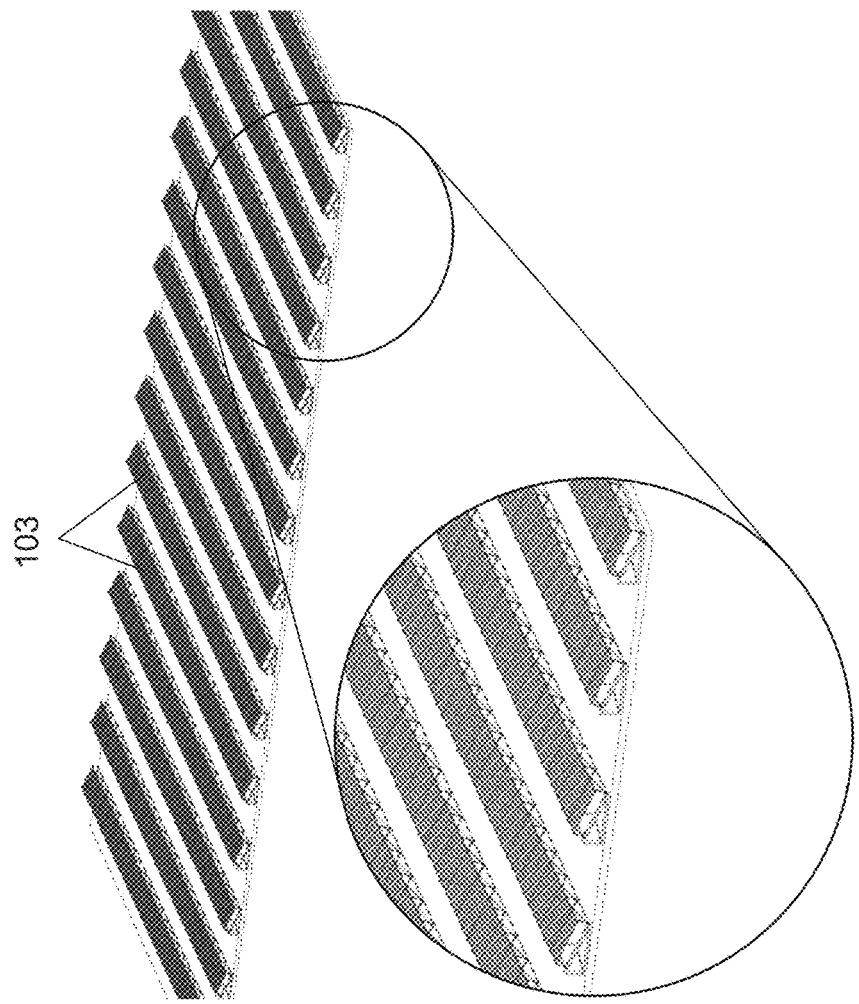
FIG. 10B shows field-sized array of strip-deployed with tilted or angled solar panels.

A plurality of tilted solar panel trusses can be deployed in multiple rows to create a larger array. FIG. 10B shows an example of a football-field sized array with multiple rows of trusses. In one embodiment, as a carrier completes deployment of one of said solar panel multi-bay trusses, it is reloaded with a new stack (which may include the identical number of truss bays as other trusses being deployed in the larger array, or a different number of truss bays, as desired), which is then deployed as a new row in the array.

Figure 11:
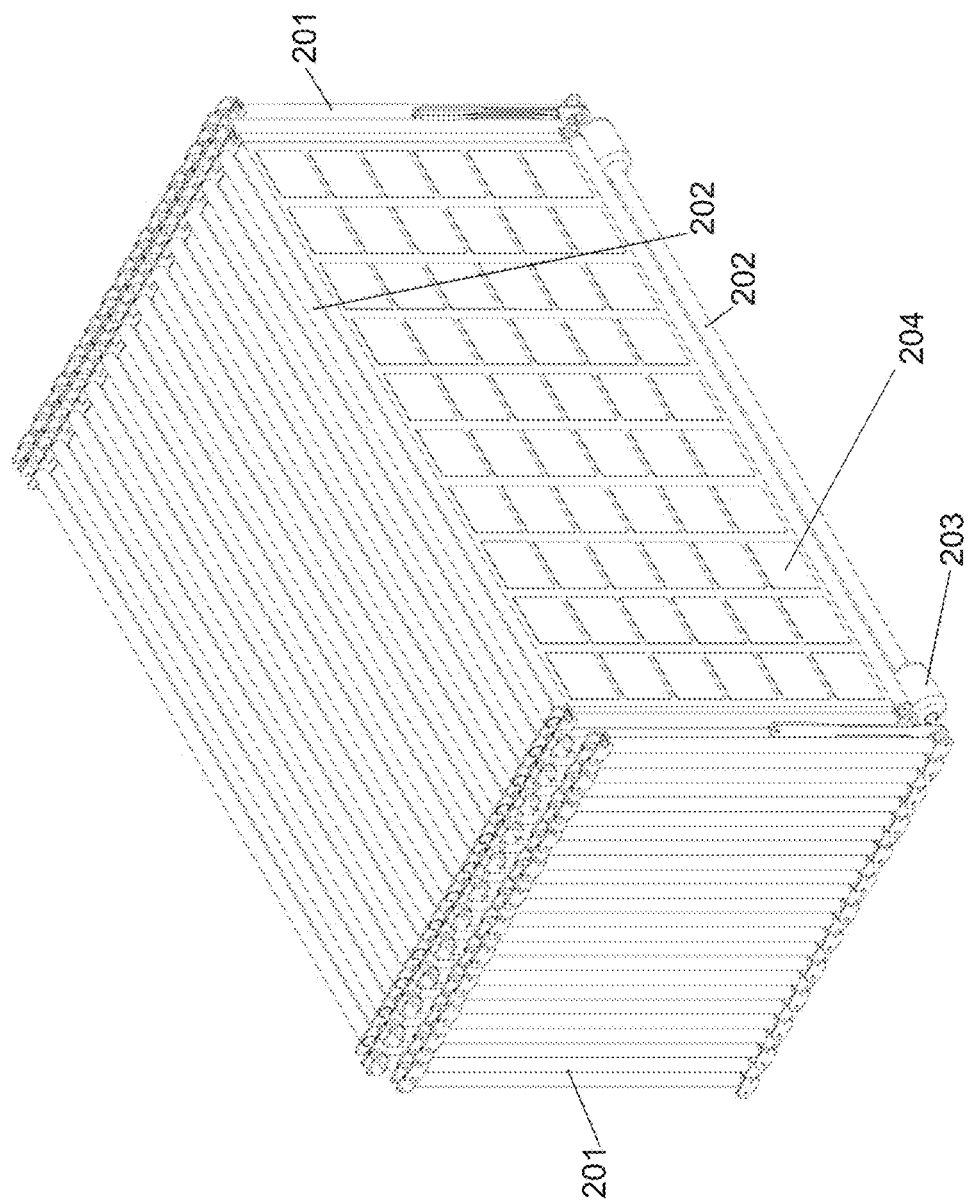
FIG. 11 shows a rectangular truss with solar panels in a retracted state with alternative folding of the primary chords.

If it is desired to deploy rows horizontally from a fixed or moving carrier, so that the truss is flat on the surface or terrain, fold-down support struts are not required. The first bay is deployed from the carrier in essentially the same fashion as described above, with bays unfolding and forming sequentially from the stack. To assist the truss bays transitioning down from the carrier to the surface or terrain in an articulated fashion, the primary chords 201 may be modified to fold in an upward or vertical plane (as seen in FIG. 11). The primary chords 201 thereby provide an additional degree of freedom to permit the transition. Alternatively, the center-hinged primary chordal members may be replaced with flexible cables.

FIG. 11 shows a modified truss in retracted position. The primary chords 201 are folded in a vertical plane orthogonal to the transverse members 202 and panels 204. The primary chord hinge axes are rotated 90 degrees from the arrangement described above with respect to FIG. 2B, so that the primary chordal members fold upward during retraction, rather than inward. This provides the extra degree of freedom to the primary joints allowing deployment from a height above the surface or terrain without the need for additional support or hardware.

Figure 12B:
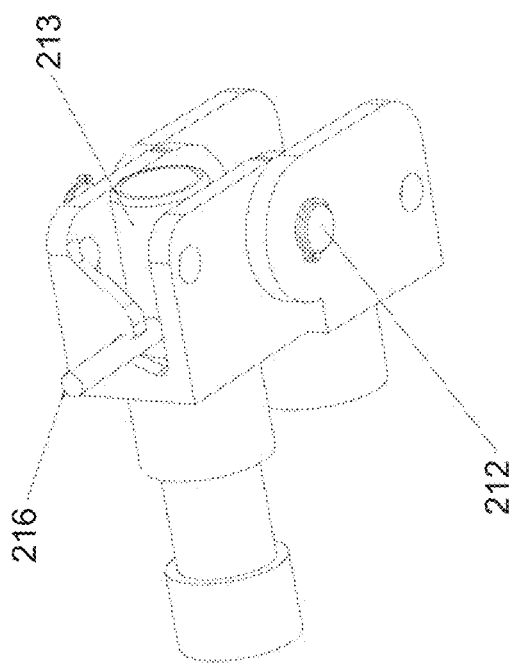
FIG. 12B shows a barrel locking hinge in an unlocked position.
Figure 12A:
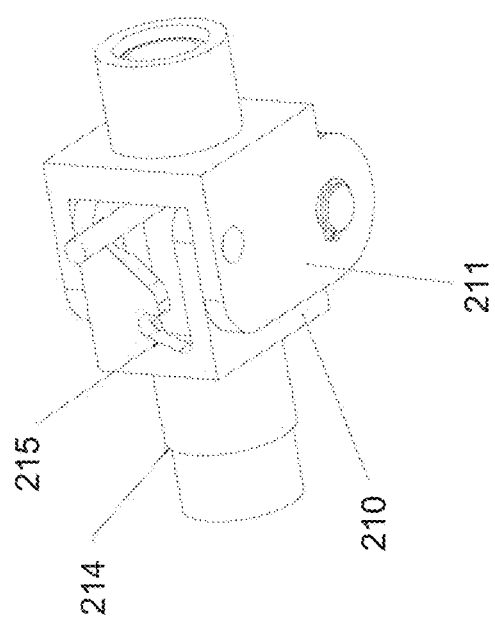
FIG. 12A shows a barrel locking hinge in a locked position.

FIGS. 12A and 12B show a unique lockable hinge joint that may be used for the center-hinged primary chords, and within the primary and secondary orthogonal joints. The hinge joint comprises a male clevis half 210 hingedly connected to a female clevis half 211 around a center hinge pin 212. A movable latch cylinder 213 on the male half (best seen in FIG. 12B, where the female half has been rotated below the male half) moves longitudinally. An optional internal spring 214 may be provided to press the latch cylinder 213 out and into a locked position. A pin 216 on the latch cylinder 213 may be used to move or rotate the latch cylinder. A detent feature 215 on the male half engages the pin 216 (as shown in FIG. 12B) and hold the latch cylinder in a withdrawn (or unlocked) position, which allows the devises freedom to rotate with respect to each other. When the pin 216 is disengaged from the détente (as shown in FIG. 12A), the cylinder is pushed forward by the spring to enter a receiving hole on the female clevis, thereby locking the joint against rotation.

Figure 13A:
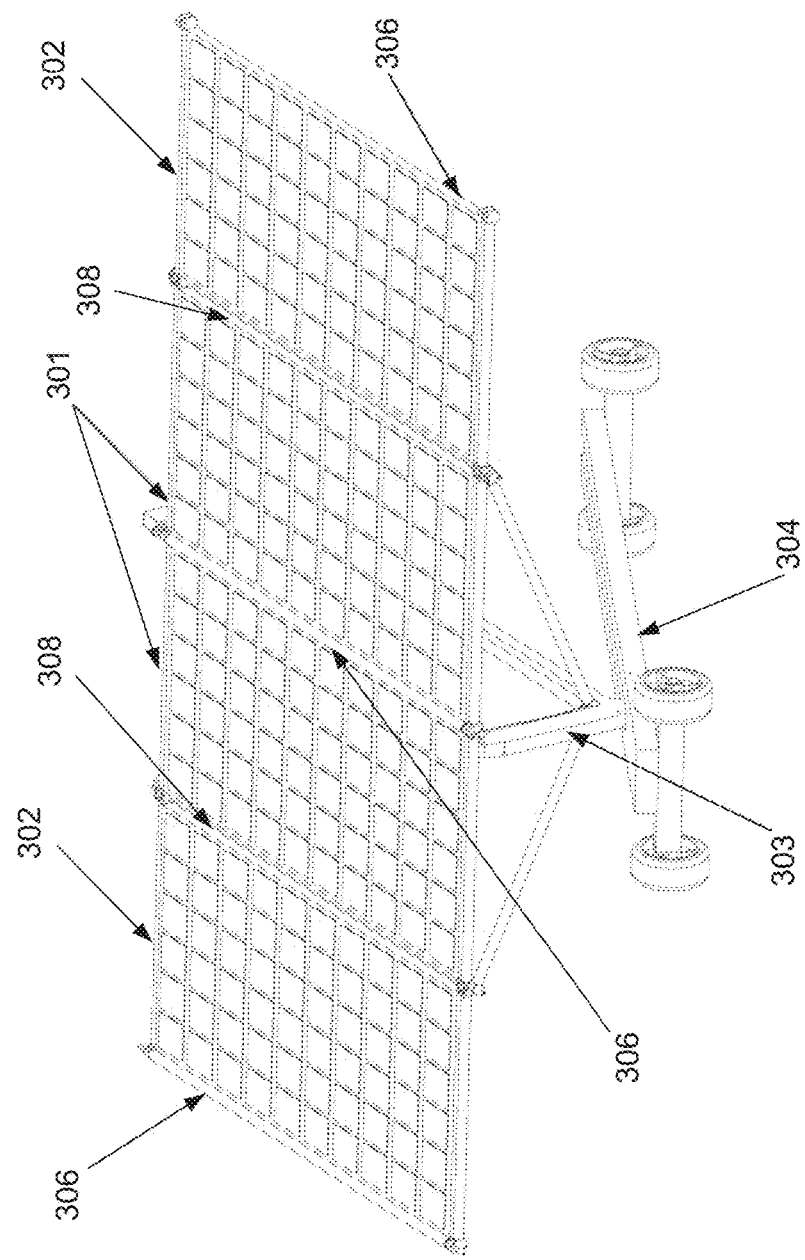
FIG. 13A shows a deployed hybrid multi-bay truss configuration with a wheeled support.
Figure 13B:
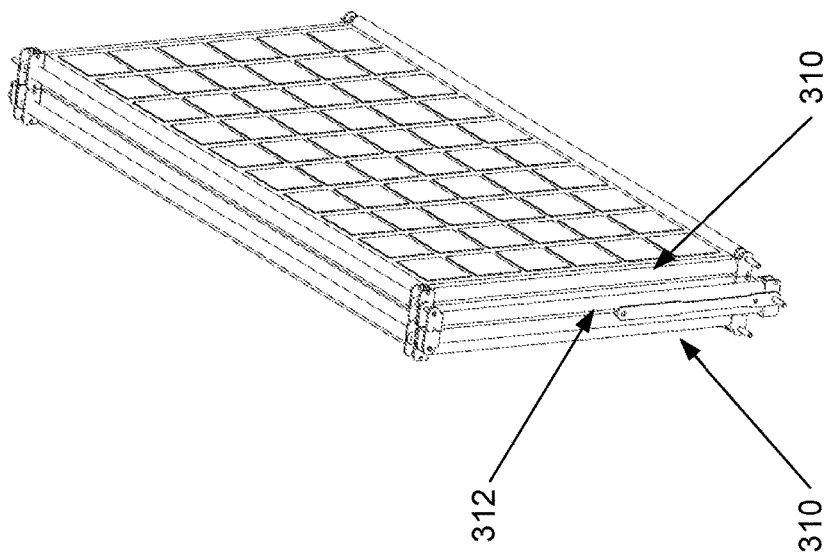
FIG. 13B shows the hybrid multi-bay truss of FIG. 13A in a retracted state.

In yet a further embodiment, as seen in FIGS. 13A and 13B, a hybrid configuration of the multi-bay truss of FIGS. 1A and 1B may be deployed. A truss bay 301 is centrally deployed, with half-bays 302 deployed on either side. The central truss bay 301 comprises four chordal members 310 (corresponding to the secondary chordal members described above) with three transverse members 320 and two panels 330. Each half-bay comprises two chordal members 310 with traverse member 320 and a panel 330. As seen in FIG. 13A, the configuration comprises four panels, with two chords (corresponding to the secondary chords described above) connected by four transverse members 320. The half-bays are locked in a rigid position using the barrel lock hinge assembly 305 shown in FIGS. 12A and 12B. With the single bay 301 deployed on a suitable mounting frame 303, the half-bays thus are locked without requiring diagonal supports. The half-bays 302 fold compactly beside the folded center bay 301 assembly when retracted (as seen in FIG. 13B).

In one embodiment, the mounting frame 303 can pivot or move on a support cart 304 (which may be wheeled or otherwise mobile). This permits the truss assembly to be manually or automatically tilted or rotated to the desired angle. Additional support (such as struts) may be provided. It should be noted that two or more bays with panels may be used for a longer version of the hybrid configuration (i.e., multiple bays in a linear configuration, with two half-bays deployed on either end), with suitable modifications to the mounting frames.

Thus, it should be understood that the embodiments and examples described herein have been chosen and described in order to best illustrate the principles of the invention and its practical applications to thereby enable one of ordinary skill in the art to best utilize the invention in various embodiments and with various modifications as are suited for particular uses contemplated. Even though specific embodiments of this invention have been described, they are not to be taken as exhaustive. There are several variations that will be apparent to those skilled in the art.

What is claimed is:

1. A mobile solar array, comprising:
   at least one support cart with a truss mounting frame pivotally mounted thereto;
   at least one folding truss mounted on truss mounting frame, said at least one folding truss comprising at least two chords, said chords comprising a plurality of chordal members connected end-to-end by a plurality of hinge joints wherein the plurality of hinge joints comprise a barrel lock hinge joint with a male clevis half with a detent; a female clevis half hingedly connected to the male clevis half by a center hinge pin; and a latch cylinder with a lock pin, wherein said latch cylinder is in an unlocked position when the lock pin engages the detent in the male clevis half, and in a locked position when the lock pin is disengaged from the detent; and
   a plurality of solar panels extending between the chords; wherein the truss mounting frame is configured to tilt to a desired angle.

2. The mobile solar array of claim 1, further wherein said support cart comprises one or more wheels.

3. The mobile solar array of claim 1, wherein the barrel lock hinge joint further comprises a spring operably engaged with the latch cylinder, wherein said spring presses the latch cylinder into a locked position when the lock pin is disengaged from the detent.

4. The mobile solar array of claim 1, wherein, when the truss is retracted, the plurality of chordal members fold upward at a substantially right angle to the plane formed by the chordal members when the truss is extended.

* * * * *